Oct. 6, 1964  H. W. DIETERT  3,151,368
ROTARY SCREEN MOLDABILITY CONTROLLER
Filed Aug. 21, 1961  2 Sheets-Sheet 1
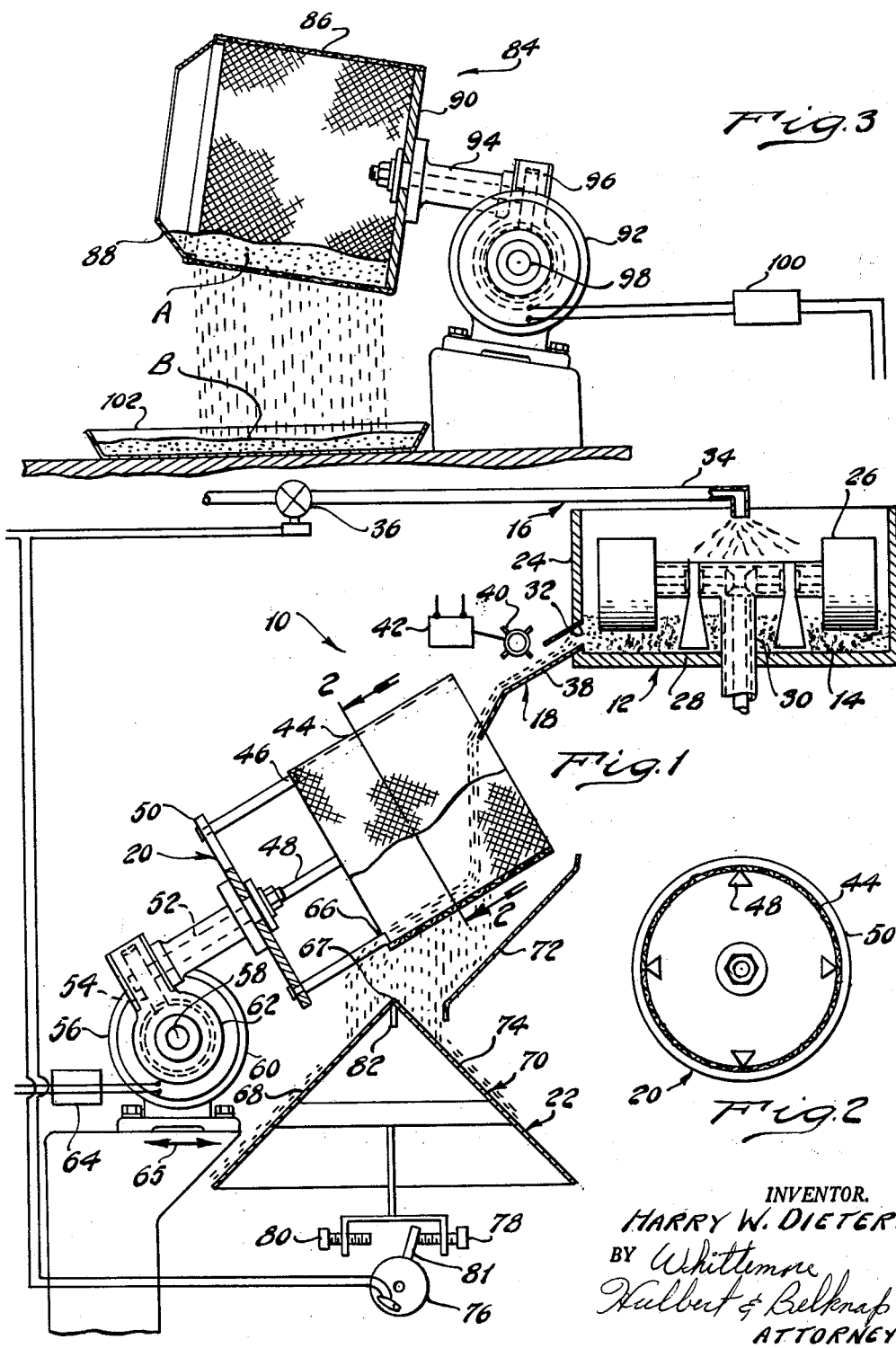
INVENTOR.
HARRY W. DIETERT
BY Whittemore
Hulbert & Belknap
ATTORNEYS Oct. 6, 1964　　　　H. W. DIETERT　　　　3,151,368
ROTARY SCREEN MOLDABILITY CONTROLLER
Filed Aug. 21, 1961　　　　　　　　　　2 Sheets-Sheet 2
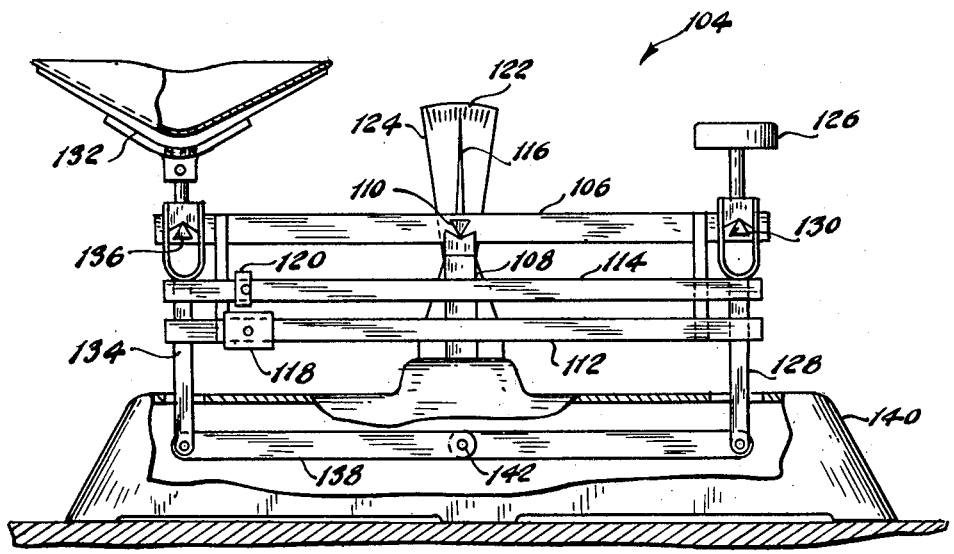
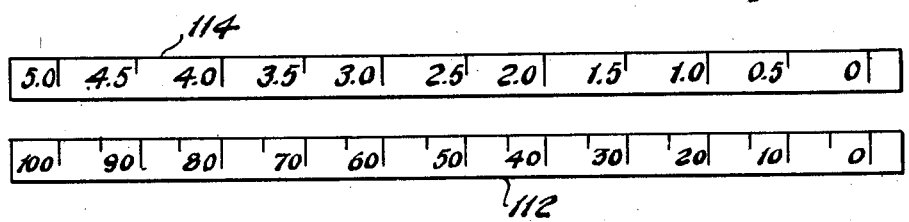
INVENTOR.
HARRY W. DIETERT
BY Whittemore,
Hulbert & Belknap
ATTORNEYS

United States Patent Office 3,151,368
Patented Oct. 6, 1964

3,151,368
ROTARY SCREEN MOLDABILITY CONTROLLER
Harry W. Dietert, Kerrville, Tex., assignor to Harry W.
Dietert Co., Detroit, Mich., a corporation of Michigan
Filed Aug. 21, 1961, Ser. No. 132,902
10 Claims. (Cl. 22—89)

The invention relates to material conditioning and refers more specifically to apparatus for determining and controlling the moldability of granular material such as sand including adjustable rotary screen means for separating a sample of the granular material in accordance with the moldability thereof.

Directly controlling an ultimate property of granular material, such as moldability of foundry sand, rather than attempting to control the ultimate property by controlling a constituent of the granular material, such as the water content thereof, is particularly desirable in that more accurate and reliable control of the ultimate property can thus be obtained.

In the past, such direct control of the moldability of granular material has been accomplished in apparatus using screens or riddles which have been electrically vibrated to advance the granular material thereover whereby the granular material has been separated into portions depending on the moldability thereof. Electrical vibrating means for such apparatus is relatively complicated and expensive. Further, such apparatus often does not provide a sufficient range of adjustments to permit control of the moldability of granular material between desired limits.

Therefore, it is one of the objects of the present invention to provide improved apparatus for controlling the moldability of granular material including rotary screen separating means.

Another object is to provide improved means for determining the moldability of granular material including rotary screen means for separating a sample of granular material in accordance with the moldability thereof and a balance for weighing the separated portions of the sample of granular material.

Another object is to provide apparatus as set forth above for determining the moldability of granular material wherein the rotary screen separating means comprises a cylindrical screen rotatable about the axis of generation thereof and closed at its lower end, the rotational axis of which screen is adjustable angularly with respect to the horizontal, and the speed of rotation of which screen is controllable to vary the relative portions into which a sample of granular material of predetermined moldability may be separated.

Another object is to provide structure as set forth above wherein the balance which may be used to determine the weights of the separated portions of granular material so that the moldability thereof may be calculated is constructed so that a direct reading of the moisture content of a sample of granular material may be obtained therefrom.

Another object is to provide a balance structure and method of use thereof permitting direct reading of the moisture content of granular material from the balance structure scales.

Another object is to provide apparatus for controlling the moldability of granular material comprising a muller for mixing granular material and an additive, means for adding an additive to the granular material in the muller, cylindrical rotary screen separating means positioned to receive a sample of granular material from the muller, means for feeding a substantially constant sample of granular material from the muller onto the rotary screen separating means, and means for controlling the additive added to the muller in accordance with the weight of the separated portions of the continuous sample of granular material.

Another object is to provide apparatus as set forth above wherein the axis of rotation of the rotary screen separating means is angularly adjustable with respect to the horizontal, and the rotary speed thereof is variable.

Another object is to provide apparatus for determining and controlling the moldability of granular material which is simple in operation, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation view partly in section of apparatus constructed in accordance with the invention for controlling the moldability of granular material.

FIGURE 2 is a cross sectional view of a portion of the granular material moldability controller illustrated in FIGURE 1 taken on the line 2—2 in FIGURE 1.

FIGURE 3 is an elevation view partly in section of apparatus for use in determining the moldability of granular material.

FIGURE 4 is an elevation view partly in section of a balance for use in determining the moldability and moisture content of granular material.

FIGURE 5 is an enlarged view of the scales of the balance illustrated in FIGURE 4.

With particular reference to the figures of the drawing, an embodiment of the invention will now be disclosed.

The apparatus for controlling the moldability of granular material 10 illustrated in FIGURE 1 includes the muller 12 for mixing granular material 14 and an additive, the additive supply means 16 and transfer means 18 for feeding a substantially constant sample of the mixed granular material from the muller 12 to the rotary screen separating means 20. Rotary screen separating means 20 for receiving the continuous sample of granular material and separating it into portions according to the moldability thereof and the means 22 for controlling the addition of additive to the muller 12 through additive supply means 16 in accordance with the relative weight of the separated portions of the sample of granular material are also included as part of the apparatus 10 for controlling the moldability of granular material.

In operation, the speed of rotation and the angular position of the rotary screen separating means 20 may be adjusted to cause halting of the addition of additives to the muller 12 with the granular material therein at different moldabilities.

More specifically, the muller 12 includes the container 24 for receiving the granular material 14 and additive to be mixed and the rollers 26 and scrapers 28 rotatably mounted on rotatable shaft 30 within the container 24. The container 24 further includes the opening 32 therein adjacent the bottom thereof through which a constant sample of the mixed granular material and additive in the container 24 is fed on rotation of shaft 30 due to the action of the scrapers 28 and rollers 26.

The additive supply means 16 includes the pipe 34 and an additive reservoir (not shown) operable to supply an additive, such as water, to the muller 12. The solenoid actuated valve 36 is provided in the pipe 34 and is operable when actuated to prevent addition of additive to the muller 12.

The transfer means 18 for feeding of samples of granular material from the muller to the rotating screen separating means 20 comprises a chute 38 extending between the muller 12 and the rotary screen separating means 20 in conjunction with the paddle 40 rotatable by means of electric motor 42 to insure a substantially constant volume of granular material fed to the rotary screen separating means 20. Rotating paddles 40 also serve to break up any compacted samples of granular material passing through the opening 32 in the container 24.

The rotary screen separating means 20 includes the cylindrical screen 44 supported on the ends 46 of the rods 48. The rods 48 are secured to the periphery of the plate 50, which plate 50 is connected by the shaft 52 and gears 54 for rotation by the motor 56. The angular position of the axis of rotation of the screen 44 relative to a horizontal plane is adjustable by angular movement of the fitting 62 about the drive shaft 58. In addition, the rotational speed of the motor 56 and therefore of the screen 44 is variable by convenient means, such as a rheostat 64, in the electrical input conductors to the motor. Motor 56 is adjustable by convenient means (not shown) in the direction of arrow 65 to insure the edge 66 of screen 44 is positioned over the apex 67 of the balance 70.

In operation, the granular material from the transfer means 18 is deposited on the rotating screen 44. Part of the granular material travels down the rotating inclined screen 44 and falls over the edge 66 thereof onto the side 68 of the balance 70. The rest of the sample of granular material will fall through the screen 44 and is guided by the guide plate 72 onto the side 74 of the balance 70. The relative portions of the sample of granular material falling on the sides 68 and 74 of the balance 70 will vary depending on the moldability of the granular material deposited on the screen and with the angular position of the screen 44 and the speed of rotation thereof.

The means 22 for controlling the addition of additive to the muller 12 in accordance with the relative weight of the separated portions of the sample of granular material includes the balance 70, the mercury switch 76 actuated by the adjustable stops 78 and 80 which are carried by the balance 70, the solenoid actuated valve 36 and the electrical circuit completed by the mercury switch 76.

Thus, in operation, with the axis of rotation of the rotating inclined screen 44 at a predetermined angle with respect to the horizontal and rotating at a predetermined speed, portions of the sample of granular material fed to the cylindrical screen 44 from the muller 12 will fall on both sides of the balance 70 in accordance with the moldability of the granular material in the muller 12. The balance 70 will thus be caused to move about the resilient band frictionless, pivotal mounting 82 thereof.

In response to the granular material in the muller 12 reaching a predetermined value, one of the abutments 78 or 80 will contact the lever 81 due to movement of balance 70 to actuate the mercury switch 76. Thus, the electrical circuit to the solenoid actuated valve 36 is completed to close valve 36 and thereby stop the addition of additive to the muller 12. The abutments 78 and 80 are adjustable to provide separate means for halting the addition of additive to the muller 12 with the granular material therein having varied moldability.

The apparatus 84 illustrated in FIGURE 3 for determining the moldability of granular material is similar to the rotary screen separating means 20 of FIGURE 1. In the apparatus illustrated in FIGURE 3, a cylindrical screen 86 is partly closed at one end by the tapered annular member 88 secured thereto by convenient means (not shown) and is completely closed at the other end by the plate 90 to which it is secured. Plate 90 is rotatable by the motor 92 through the shaft 94 and gear connections 96 between the shaft and motor.

The axis of rotation of the cylindrical rotatable screen 86 is also angularly adjustable with respect to a horizontal plane about the drive shaft 98 of the motor 92 in the manner that the screen 44 is rotatable about the drive shaft 58 of the motor 60. Also, means 100, such as a rheostat, is positioned in the electrical input leads to the motor 92 so that the screen 86 is rotatable at different speeds.

Thus, in operation, a sample of granular material, the moldability of which is to be determined, is placed in the rotating screen 86 through the annular member 88. The screen 86 is then rotated for a predetermined length of time at a predetermined speed and in a fixed angular position relative to a horizontal plane. The granular material passing through screen 86 during this rotation is collected, for example, in the pan 102 and the portions of the granular material in the pan 102 and that remaining in the screen 86 are weighed to determine the moldability of the sample of granular material in accordance with the following formulae wherein B is the weight of a sample of granular material passing through screen 86 and A is the weight of the sample of granular material retained within the screen 86 as more specifically set forth in the co-pending, commonly owned patent application, Serial No. 83,074, filed January 16, 1961.

$$\text{Moldability} = \frac{B}{A+B} \cdot 100$$

$$\text{Toughness} = \frac{A}{A+B} \cdot 100$$

For any given material or set of conditions, the angular position of the screen 86 with respect to the motor 92 and the speed of the motor 92 may be varied. Weighing of the portions of the granular material from the pan 102 and screen 86 may, if desired, be accomplished on a balance such as balance 104 illustrated in FIGURE 4.

The balance 104 illustrated in FIGURE 4 includes the balance beam 106 pivotally mounted on post 108 by pivot means 110 in the usual manner. Balance beam 106 also supports the scales 112 and 114 which are shown in detail in FIGURE 5 and the indicator needle 116. Weights 118 and 120 are adjustable along the scales 112 and 114 as will be subsequently considered. The indicator needle 116 operates in conjunction with the graduations 122 on indicator post 124 to indicate balancing of the balance beam 106. The weight 126 is secured to post 128 and is pivotally mounted on balance beam 106 by pivot means 130 as shown. Similarly, the sample pan 132 is mounted on post 134 pivoted to the other end of beam 106 by pivot means 136. Posts 128 and 134 are connected by the linkage 138 parallel to the balance beam 106 and pivoted to the base 140 by pivot means 142.

In operation, the balance as shown in FIGURE 4 and having scales thereon, as shown in detail in FIGURE 5, may be used to determine the weight of the portion of granular material deposited in pan 102 and the weight of the portion remaining in the cylindrical screen 86 by placing the separated portions of the granular material individually in the sample pan 132 and placing known weights on the weight 126 to cause the balance to balance while the weight 118 is at 100 on the lower scale 112 and the weight 120 is at zero on the upper scale 114 since the weight 118 is exactly equal to the combined weights 120 and 126. Calculations to determine moldability of the sample of granular material may then be made in accordance with the above formulae.

If it is desired to measure the exact moisture content of the granular material, the balance 104 may be used to read directly from the scale 112 or 114 the exact moisture content of the granular material. In this method of use of the balance 104, the balance is caused to balance by placing a sample of granular material in the pan 132 while the weights 120 and 118 are at zero. The granular material in the tray 132 is then heated to remove the moisture therefrom and then returned to its position on the balance 104. Either the weight 118 or the weight 120 is then moved to the left along the respective scales 112 or 114 until the balance again comes into balance. The percentage of moisture in the granular material deposited in the pan 132 may then be read directly from the scale 112 or 114.

For such use of the balance 104, it will be noted that the weights 118 and 120 must have a 1:2 ratio considering the relation of the individual weights to the total weight, with respect to the full scale reading on the scale on which the particular weight is mounted. Thus, the weight 118 is one-half of the combined total weight, while the weight 120 is two and one-half percent of the combined total weight.

The drawings and the foregoing specification constitute a description of the improved rotary screen moldability controller in such full, clear, concise and exact terms as to enable any person skilled in the art to practice the invention, the scope of which is indicated by the appended claims.

What I claim as my invention is:

1. Apparatus for controlling the moldability of granular material comprising a muller for mixing the granular material and an additive, means for adding an additive to granular material in the muller, rotating screen separating means for separating granular material placed therein into portions in accordance with the moldability thereof, means for continually feeding a sample of granular material from said muller to said separating means, and means operably associated with said separating means and said means for adding an additive to the granular material for receiving the separated portions of the sample of granular material and for stopping the addition of additive to the granular material in the muller in response to the moldability of the sample of granular material fed to the separating means reaching a predetermined value as indicated by a predetermined separation of the sample of granular material.

2. Apparatus for controlling the moldability of granular material comprising a muller for mixing the granular material and an additive, means for adding an additive to granular material in the muller, separating means for separating granular material placed therein into portions in accordance with the moldability thereof, including an inclined rotatable circular base plate, a plurality of rods secured at one end around the periphery of the base plate and extending upwardly and outwardly from one side thereof substantially perpendicularly thereto and a cylindrical open ended screen secured at one end to the free ends of the rods in spaced relation to the base plate, means for rotating the granular material separating means, means for feeding a substantially constant sample of granular material from the muller into the screen, balance means positioned beneath the screen for receiving granular material passing transversely through the screen on one side thereof and granular material passing through the end of the screen on the other side thereof whereby the position of the balance is determined and means connected between the means for adding additive to the granular material in the muller and the balance responsive to the position of the balance for controlling the addition of additive to the granular material in the muller in accordance with the ratio of the weight of granular material received on the opposite sides of the balance.

3. Structure as set forth in claim 2 wherein means are provided for varying the speed of rotation of the granular material separating means.

4. Structure as set forth in claim 2 wherein means are provided for adjusting the angle of inclination of the base plate of the granular material separating means.

5. Structure as set forth in claim 2 and further including means for varying the horizontal position of the separating means for maintaining the bottom of the lower end of the screen in a predetermined position with respect to the balance.

6. Structure as set forth in claim 2 wherein the balance comprises a pair of oppositely inclined planes and a resilient band, centrally located pivot mounting therefor.

7. Structure as set forth in claim 2 wherein the means for controlling the addition of additive to the granular material in accordance with the ratio of weight of granular material received on the opposite sides of the balance comprises a solenoid operated valve, means for energizing the solenoid operated valve on completion of a circuit therethrough and a mercury switch for completing a circuit through the means for energizing the valve and a pair of abutments secured to and movable with said balance for actuating said switch in accordance with the position of the balance.

8. Apparatus for controlling the moldability of granular material comprising a muller for mixing the granular material and an additive, means for adding an additive to granular material in the muller, rotating screen separating means for separating granular material placed therein into portions in accordance with the moldability thereof, means for continually feeding a sample of granular material from said muller to said separating means, and means operably associated with said separating means and said means for adding an additive to the granular material for receiving the separated portions of the sample of granular material and for stopping the addition of additive to the granular material in the muller in response to the moldability of the sample of granular material fed to the separating means reaching a predetermined value as indicated by a predetermined separation of the sample of granular material including a balance positioned beneath said rotating screen separating means to receive the separated portions of the sample of granular material on opposite sides thereof whereby said balance is moved into a position representative of the moldability of the sample of granular material, a solenoid actuated valve in the means for adding an additive to granular material in the muller operable on actuation to stop the addition of additive to the granular material and an electric circuit connected to said valve operable on completion to actuate said valve including a mercury switch positioned adjacent said balance and means engageable therewith connected to said balance for operating said switch to complete said circuit in response to said balance moving into a predetermined position.

9. Structure as claimed in claim 8 wherein the means engageable with the mercury switch comprises a pair of adjustable abutments carried by the balance for engaging said mercury switch and completing said circuit in response to movement of the balance whereby said predetermined position may be adjusted.

10. Apparatus for controlling the moldability of granular material comprising a muller for mixing the granular material and an additive, means for adding an additive to granular material in the muller, rotatable, inclined, open ended, cylindrical screen separating means for separating granular material placed therein into portions in accordance with the moldability thereof, means for continually feeding a sample of granular material from said muller to said separating means, and means operably associated with said separating means and said means for adding an additive to the granular material for receiving the separated portions of the sample of granular material and for stopping the addition of additive to the granular material in the muller in response to the moldability of the sample of granular material fed to the separating means reaching a predetermined value as indicated by a predetermined separation of the sample of granular material.

References Cited in the file of this patent

UNITED STATES PATENTS

| 1,775,246 | Klopsteg | Sept. 9, 1930 |
| 2,189,711 | Eigenbrot | Feb. 6, 1940 |
| 2,489,635 | Gruber | Nov. 29, 1949 |
| 2,582,017 | Eagle | Jan. 8, 1952 |
| 2,782,926 | Saxe | Feb. 26, 1957 |
| 2,854,714 | Dietert | Oct. 7, 1958 |
| 2,959,830 | Castera | Nov. 15, 1960 |
| 3,002,623 | Fontaine | Oct. 3, 1961 |